United States Patent
Awwad et al.

(10) Patent No.: US 8,397,528 B2
(45) Date of Patent: Mar. 19, 2013

(54) REFRIGERATED TRANSPORT SYSTEM

(75) Inventors: Nader S. Awwad, Baldwinsville, NY (US); John R. Reason, Liverpool, NY (US)

(73) Assignee: Carrier Corporation, Farmington, CT (US)

( * ) Notice: Subject to any disclaimer, the term of this patent is extended or adjusted under 35 U.S.C. 154(b) by 819 days.

(21) Appl. No.: 12/521,315

(22) PCT Filed: Jan. 8, 2007

(86) PCT No.: PCT/US2007/060220
§ 371 (c)(1),
(2), (4) Date: Jun. 26, 2009

(87) PCT Pub. No.: WO2008/085516
PCT Pub. Date: Jul. 17, 2008

(65) Prior Publication Data
US 2010/0089083 A1    Apr. 15, 2010

(51) Int. Cl.
F25B 41/04    (2006.01)
(52) U.S. Cl. .......................................... 62/225
(58) Field of Classification Search .............. 62/222, 62/223, 224, 225
See application file for complete search history.

(56) References Cited

U.S. PATENT DOCUMENTS

| | | |
|---|---|---|
| 4,380,909 A | 4/1983 | Sung |
| 4,711,095 A | 12/1987 | Howland et al. |
| 4,835,976 A | 6/1989 | Torrence |
| 5,577,390 A | 11/1996 | Kaido et al. |
| 5,626,027 A | 5/1997 | Dormer et al. |
| 6,044,651 A | 4/2000 | Reason et al. |
| 6,301,911 B1 | 10/2001 | Reason et al. |
| 6,330,909 B1 | 12/2001 | Takahashi et al. |
| 2004/0134206 A1 | 7/2004 | Lee et al. |
| 2005/0150240 A1* | 7/2005 | Doi et al. ................ 62/225 |

OTHER PUBLICATIONS

European Search Report for EP Patent Application No. 07709988.5, dated Oct. 15, 2012.

* cited by examiner

Primary Examiner — Marc Norman
(74) Attorney, Agent, or Firm — Bachman & LaPointe, P.C.

(57) ABSTRACT

A refrigerated transport system has a container, a generator system, and a refrigeration system. The refrigeration system is electrically coupled to the generator to receive electric power and thermally coupled to the container. The refrigeration system includes an electrically powered compressor. A condenser is downstream of the compressor along a refrigerant flowpath. An expansion device is downstream of the compressor along the refrigerant flowpath. An evaporator is downstream of the expansion device along the refrigerant flowpath. A controller is coupled to the expansion device to control operation of the expansion device. The controller is configured to operate the expansion device to control an evaporator superheat. The evaporator superheat is to be relatively high for a set temperature of a first valué associated with non-frozen perishables. The evaporator superheat is to be relatively low for a second valué of the temperature associated with frozen goods and subject to maintenance of a minimum suction superheat.

13 Claims, 3 Drawing Sheets

REFRIGERATED TRANSPORT SYSTEM

BACKGROUND OF THE INVENTION

The invention relates to refrigeration. More particularly, the invention relates to electrically-powered refrigerated transport systems.

A transport refrigeration system used to control enclosed areas, such as the box used on trucks, trailers, containers, or similar intermodal units, functions by absorbing heat from the enclosed area and releasing heat outside of the box into the environment. A number of transport refrigeration units, including units currently sold by assignee, employ a reciprocating compressor to pressurize refrigerant to enable the removal of heat from the box. Reciprocal compressors used in such applications commonly include a suction inlet and a discharge which are connected, respectively, to the evaporator and condenser of the transport refrigeration system. It is axiomatic that in order to ensure the reliability of the reciprocating compressor, the compressor should operate within the limits of the suction and discharge pressures for which it was designed. The ranges and ratios of suction and discharge pressures designed to be handled by a reciprocating compressor at various stages of operation is known as an operating envelope. The failure to operate within the compressor operating envelope will result in unnecessary wear and tear, and ultimately will bring about the premature failure of the compressor, thus creating unacceptable costs of money and time to the operator.

Transport refrigeration systems currently employ a variety of controls to manipulate the operating envelope of a reciprocating compressor. As can be shown by U.S. Pat. Nos. 5,626,027 and 5,577,390, both assigned to the assignee of the present invention, compressors can be operated in a multistage mode or in single stage modes depending upon operating temperature. Such disclosures further discuss generally the use of suction modulation for capacity control.

U.S. Pat. No. 6,301,911 discloses use of a controller within the transport refrigeration system which closes the suction modulation valve (the "SMV") and/or unloads compressor cylinder banks in response to discharge pressures in excess of a preselected limit calculated or compared to a set value by the controller. An unloader, when energized has the effect of removing one or more cylinders from operation within compressor, thus effectively reducing the displaced volume within the compressor. Maintaining the reciprocating compressor within its design operating envelope may be achieved by selectively unloading compressor cylinder banks in the event that suction pressure is below the minimum suction pressure allowed, as determined the controller.

There are many operational considerations for the units. Several considerations involve the temperature at which the enclosed area is to be kept. A given unit configuration may be made manufactured for multiple operators with different needs. Broadly, the temperature may be separated into two fields: frozen goods; and non-frozen perishables. An exemplary frozen goods temperature is about −10° F. or less an exemplary non-frozen perishable temperature is 34-38° F. Many operators will have the need to, at different times, use a given unit for transport of frozen goods and non-frozen perishables. The operator will predetermine appropriate temperature for each of the two modes. prior to a trip or series, the driver will enter the appropriate one of the two temperatures.

SUMMARY OF THE INVENTION

One aspect of the invention involves a refrigerated transport system having a container, a generator system, and a refrigeration system. The refrigeration system is electrically coupled to the generator to receive electric power and thermally coupled to the container. The refrigeration system includes an electrically powered compressor. A condenser is downstream of the compressor along a refrigerant flowpath. An expansion device is downstream of the compressor along the refrigerant flowpath. An evaporator is downstream of the expansion device along the refrigerant flowpath. A controller is coupled to the expansion device to control operation of the expansion device. The controller is configured to operate the expansion device to control an evaporator superheat. The evaporator superheat is to be relatively high for a set temperature of a first value associated with non-frozen perishables. The evaporator superheat is to be relatively low for a second value of the temperature associated with frozen goods and subject to maintenance of a minimum suction superheat.

Another aspect of the invention involves a method for operating a refrigerated transport system. A target compartment temperature is determined. For a relatively high value of the target temperature, an expansion device is operated to provide a relatively high superheat. For a relatively low value of the target temperature, the expansion device is operated to provide a relatively low superheat, subject to maintenance of a minimum suction superheat. The relatively high superheat and relatively low superheat may be evaporator outlet superheats.

Another aspect of the invention involves a method for operating a refrigerated transport system. A target compartment temperature is received. A sufficiency of a suction superheat is determined. When either: (1) the target temperature is of a relatively high value; or (2) said target temperature is relatively low but accompanied by insufficient suction superheat, an expansion device is operated to provide a relatively high superheat. When simultaneously the target temperature is of a relatively low value and the suction superheat is sufficient, the expansion device is operated to provide a relatively low superheat.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 2:
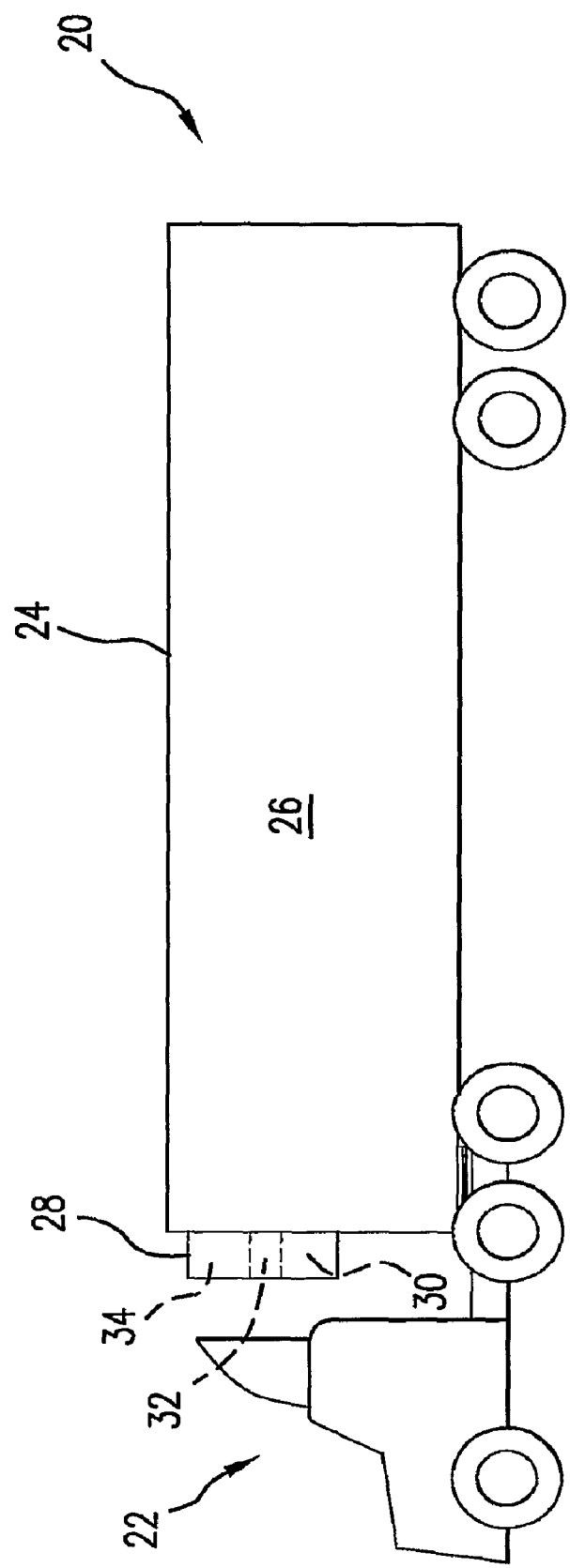
FIG. 2 is a partially schematic view of a refrigerated transport system.

FIG. 2 shows a refrigerated transport unit (system) 20 in the form of a refrigerated trailer. The trailer may be pulled by a tractor 22. The exemplary trailer includes a container/box 24 defining an interior/compartment 26. An equipment housing 28 mounted to a front of the box 24 may contain an electric generator system including an engine 30 (e.g., diesel) and an electric generator 32 mechanically coupled to the engine to be driven thereby. A refrigeration system 34 may be electrically coupled to the generator 32 to receive electrical power.

Figure 3:
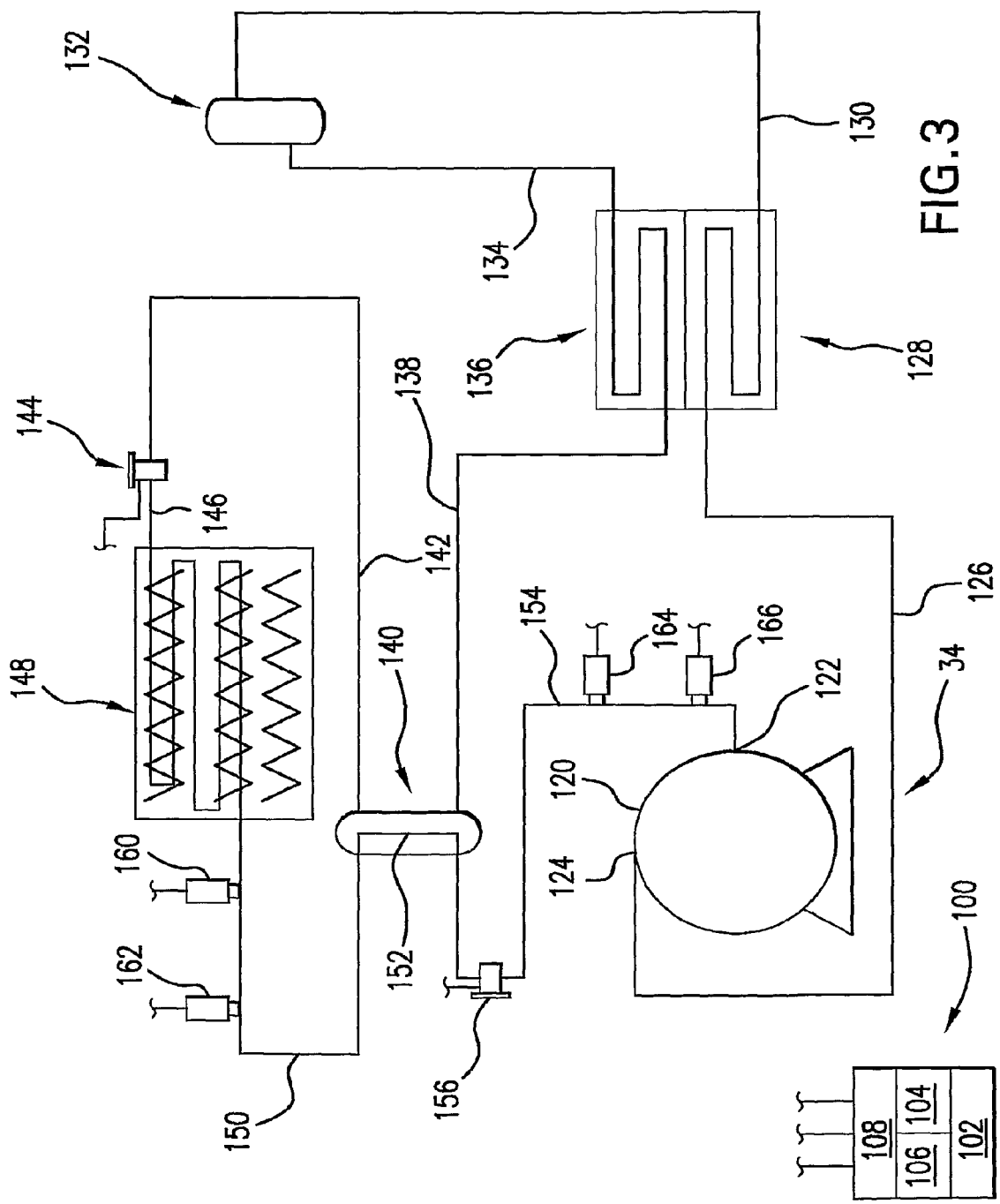
FIG. 3 is a schematic view of a refrigeration system of the unit of FIG. 2.

FIG. 3 shows further details of the exemplary refrigeration system 34. The system 34 includes a control system 100. The control system 100 may include: one or more user interface (e.g., input/output) devices 102; processors 104; memory 106; and hardware interface devices 108 (e.g., ports).

The system 34 further includes a compressor 120 having a suction (inlet) port 122 and a discharge (outlet) port 124. An exemplary compressor 120 is an electrically-powered reciprocating compressor having an integral electric motor. The compressor 120 may be coupled to the control system 100 to regulate its operation and to the generator 32 to receive power. A discharge line section/segment 126 extends from the discharge port 124 downstream along a refrigerant primary flowpath to an inlet of a heat rejection heat exchanger (condenser) 128. A hot liquid refrigerant line section/segment 130 extends downstream from an outlet of the condenser 128 to an inlet of an exemplary receiver 132. A hot liquid line section/segment 134 extends from an outlet of the receiver 132 to an inlet of a subcooler 136. The subcooler 136 and condenser 128 may be positioned to receive an external airflow (e.g., driven by a fan—not shown). A liquid line section/segment segment 138 extends downstream from an outlet of the subcooler 136 to an inlet of a suction line heat exchanger (SLHX) 140. A further liquid line section/segment 142 of the refrigerant line extends downstream from an outlet of the SLHX 140 to an inlet of an expansion device (e.g., an electronic expansion valve (EEV)) 144. A final liquid line section/segment 146 extends from an outlet of the electronic expansion valve 144 to an inlet of a heat rejection heat exchanger (evaporator) 148. A first section/segment 150 of a suction line extends downstream from the outlet of the evaporator 148 to the suction line heat exchanger 140. A second section/segment 152 of the suction line extends within the suction line heat exchanger 140 to form a downstream leg in heat exchange relation with fluid in the upstream leg of the heat exchanger 140. A final section/segment 154 of the suction line returns to the suction port 122. A compressor suction modulation valve (CSMV) 156 may be located in the line 154

The physical configuration of the system is merely illustrative and may schematically represent any of a number of existing or yet-developed constructions. The inventive methods described below may also be applicable to other constructions.

The system 34 may include various additional components including valves, sensors, and the like. Of these, sufficient sensors for determining a characteristic evaporator superheat and a characteristic suction superheat are required and particular exemplary implementations are described below. An exemplary characteristic evaporator superheat is an evaporator outlet superheat (EVOSH) and may be determined responsive to measurements of an evaporator outlet temperature (EVOT) and an evaporator outlet pressure (EVOP). Accordingly, the exemplary system 34 includes an EVOP sensor 160 and an EVOT sensor 162 along the segment 150 and in signal communication with the control system 100. The suction superheat (SSH) may similarly be determined responsive to measurements of compressor suction temperature (CST) and compressor suction pressure (CSP). Along the segment 154 downstream of the SLHX 140, a pressure sensor 164 and a temperature sensor 166 are similarly positioned for measuring CSP and CST, respectively.

In operation, a user will enter a temperature at which the compartment 26 is to be maintained. In one basic example, immediate entry may be by means of a simple two position switch wherein one position is associated with frozen goods and another position is associated with non-frozen perishable goods. The control system 100 may be pre-programmed (via software or hardware) with associated target compartment temperatures. For example, a frozen goods target temperature may typically be a particular temperature in a range of about −10° F. or below whereas a non-frozen perishable goods temperature may be a particular temperature in a range of about 34-38° F. The particular values may be pre-set according to the needs of the particular unit operator.

Figure 1:
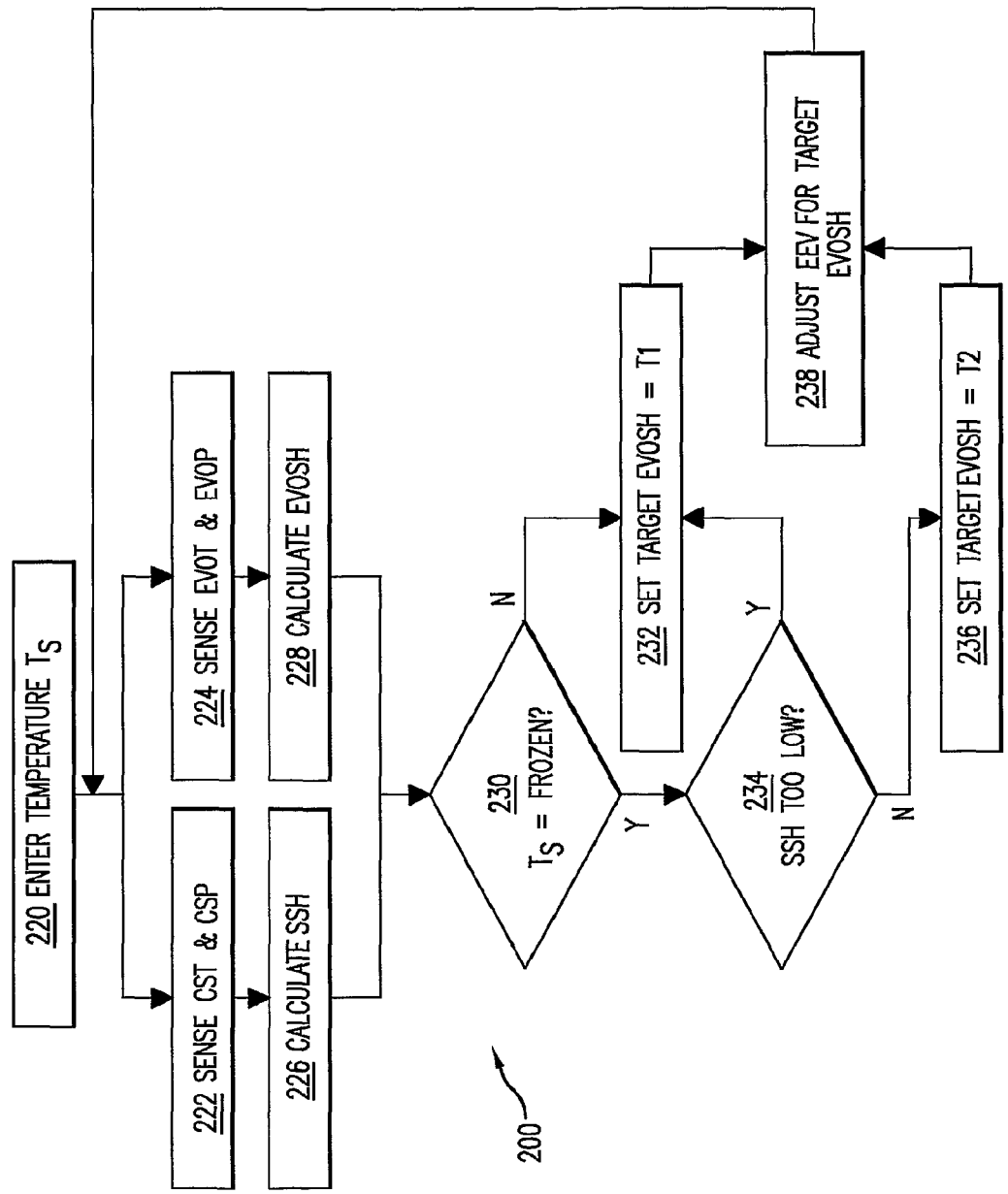
FIG. 1 is a flowchart of an evaporator superheat process according to the present invention.

FIG. 1 is an exemplary flowchart of an exemplary process for controlling the EEV 144. The example is merely illustrative and the process may be depicted in different forms and the results may be achieved by different steps. The process could be combined with other processes involving other inputs and outputs and components beyond the EEV. A set temperature $T_S$ associated with either frozen goods or non-frozen perishables is entered 220. CST and CSP are sensed 222 and EVOT and EVOP are sensed 224. The sensed inputs may be used by the processor to calculate SSH 226 and calculate EVOSH 228. It is determined 230 whether $T_S$ is associated with the frozen regime or the non-frozen perishable regime. In a basic implementation of the determining 230, a preset dividing line is used between the frozen and non-frozen regimes. As noted above, these regimes are usually separated by a fairly large gap. For example, a dividing line of 10° F. may be used so that $T_S$ at or below this dividing line is determined to be the frozen regime. If not the frozen regime, a target EVOSH is set 232 in the control system to equal a first value $T_1$ associated with the non-frozen perishable regime. An exemplary $T_1$ is about 15° F.

If, however, $T_S$ is associated with the frozen regime, then there may be further determination. In the exemplary process, it is determined 234 whether the SSH (calculated at 226) is too low so that operation at a lower EVOSH $T_2$ (described below) would entail a risk of flooding the compressor. For example, the presence of the SLHX will cause SSH to typically be higher than EVOSH by a condition-dependent amount. If not sufficiently high, there is a risk of flooding. If SSH is unnecessarily high, capacity is compromised. An exemplary determining 234 uses a value that may be near or similar to $T_1$. For an exemplary threshold of the SSH of 15° F., if the calculated SSH is 15° F. or above, then the target EVOSH is set 236 at $T_2$. If the calculated SSH is below 15° F., then the target EVOSH is set to the relatively high value (e.g., also to $T_1$ in the exemplary embodiment). After the target EVOSH has been set, the EEV is adjusted based upon the calculated EVOSH and targeted EVOSH to bring the EVOSH toward the target EVOSH. The cycle may repeat without need for entry of a new temperature $T_S$ until the temperature $T_S$ is changed.

One or more embodiments of the present invention have been described. Nevertheless, it will be understood that various modifications may be made without departing from the spirit and scope of the invention. For example, when applied in the reengineering of baseline unit configuration or the remanufacturing of a baseline unit, details of the baseline may influence or dictate details of the particular implementation. Accordingly, other embodiments are within the scope of the following claims.

What is claimed is:

1. A refrigerated transport system (20) comprising:
   a container (24) having an interior (26);
   a generator system (30, 32);
   a refrigeration system (34), electrically coupled to the generator system to receive electric power and thermally coupled to the container and comprising:
   an electrically-powered compressor (120);
   a condenser (128) downstream of the compressor along a refrigerant flowpath;
   an expansion device (144) downstream of the compressor along the refrigerant flowpath;

an evaporator (148) downstream of the expansion device along the refrigerant flowpath; and
a controller (100) coupled to the expansion device to control operation of the expansion device,
wherein the controller is configured:
to operate the expansion device to control an evaporator superheat:
to be relatively high for a set temperature ($T_S$) of a first value associated with non-frozen perishables; and
to be relatively low for said set temperature of a second value associated with frozen goods, subject to maintenance of a minimum suction superheat;
for said set temperature of said first value, control the expansion device to control the superheat toward a first target superheat ($T_1$);
for said set temperature of said second value, lower than the first value, and a suction superheat above a threshold, control the expansion device to control the superheat toward a second target superheat ($T_2$) lower than the first target superheat; and
for said set temperature of said second value, lower than the first value, and said suction superheat not above a threshold, control the expansion device to control the superheat toward a third target superheat higher than the second target superheat.

2. The system of claim 1 wherein:
the second target superheat is at least 4° F. lower than the first and third target superheats.

3. The system of claim 1 wherein:
the first and third target superheats are identical.

4. The system of claim 1 wherein the controller is configured to:
receive a sensed evaporator temperature;
received a sensed evaporator pressure; and
determine, based upon said sensed evaporator temperature and sensed evaporator pressure, said evaporator superheat.

5. The system of claim 1 wherein the controller is configured to:
receive a user-entry of said set temperature.

6. The system of claim 1 wherein:
the generator system comprises a diesel engine.

7. The system of claim 1 wherein:
the container is a trailer box.

8. A method for operating a refrigerated transport system (20) comprising:
a container (24) having an interior (26);
a generator system (30, 32);
a refrigeration system (34), electrically coupled to the generator system to receive electric power and thermally coupled to the container and comprising:
an electrically-powered compressor (120);
a condenser (128) downstream of the compressor along a refrigerant flowpath;
an expansion device (144) downstream of the compressor along the refrigerant flowpath;
an evaporator (148) downstream of the expansion device along the refrigerant flowpath; and
a controller (100) coupled to the expansion device to control operation of the expansion device,
wherein the controller is configured to operate the expansion device to control an evaporator superheat:
to be relatively high for a set temperature ($T_S$) of a first value associated with non-frozen perishables; and
to be relatively low for said set temperature of a second value associated with frozen goods, subject to maintenance of a minimum suction superheat,
the method comprising:
setting the set temperature to said first value in a first mode and, via the controller, operating the expansion device to control the evaporator superheat;
setting the set temperature to said second value in a second mode, wherein the evaporator superheat in the first mode is relatively high compared with the evaporator superheat in the second mode;
in the first mode, controlling the expansion device to control the evaporator superheat toward a first target superheat;
in the second mode, during a period where a suction superheat is above a threshold, controlling the expansion device to control the evaporator superheat toward a second target superheat lower than the first target superheat; and
in said second mode, when the suction superheat is not above the threshold, controlling the expansion device to control the evaporator superheat toward a third target superheat higher than the second target superheat.

9. The method of claim 8 wherein the second target superheat is at least 4° F. lower than the first and third target superheats.

10. The method of claim 9 wherein the first and third target superheats are identical.

11. The method of claim 8 wherein the first and third target superheats are identical.

12. The method of claim 8 wherein the controller:
receives the sensed evaporator temperature;
receives a sensed evaporator pressure; and
determines, based upon said sensed evaporator temperature and sensed evaporator pressure, said evaporator superheat.

13. The method of claim 12 wherein:
the controller receives a user-entry of said set temperature.

* * * * *